Patented Mar. 17, 1942

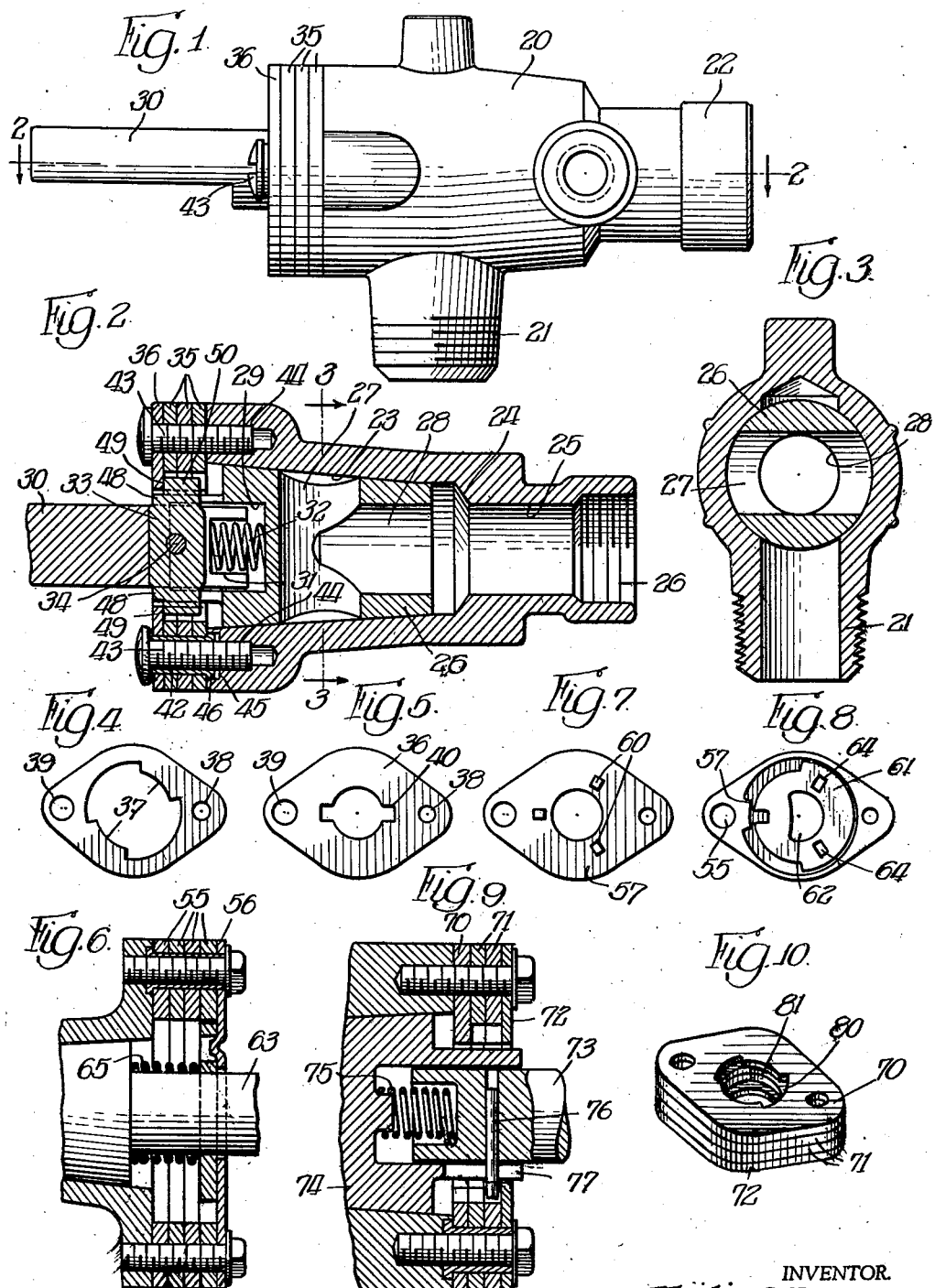

2,276,271

UNITED STATES PATENT OFFICE 2,276,271

GAS VALVE

Philip S. Harper, Chicago, Ill., assignor, by direct and mesne assignments, to Harper-Wyman Company, Chicago, Ill., a corporation of Illinois Application July 29, 1939, Serial No. 287,398

1 Claim. (Cl. 251—165)

This invention relates to an improvement in the construction of valves of the type usually employed on domestic gas stoves.

The invention resides particularly in a novel construction of top cap for the valve body. This invention is characterized as having a top cap for the valve composed of a plurality of laminated plates, each of which may be constructed in accordance with a predetermined plan whereby collectively they constitute a suitable valve cap which at the same time embodies stops and other controlling or indicating means to serve in connection with the operation of the valve in a manner hereinafter more fully pointed out.

Heretofore top caps for valves have usually been constructed as a unitary piece or of predetermined form so that each valve cap would function in connection with the valve stem and the stop lugs thereon only in a single predetermined manner, and whenever different valve operations were desired differently formed cap members were required. This invention employs a top cap made up of a plurality of laminated plates which may be selectively assembled to give any one of a plurality of possible combinations of plates, whereby various operative possibilities result.

The plates constituting the various laminations of the top cap of this invention may be made by simple and inexpensive stamping operations, whereby a selection of different types may be provided at a minimum of cost and the caps required for different valve operations assembled and formed merely by the selection of the required laminated plates.

It is an object of this invention to provide an improved top cap for gas valves of the type referred to which may be more easily and inexpensively manufactured and more readily assembled than top caps heretofore employed for valves.

It is a further object of this invention to provide top caps which embody stops as well as indicating clicking mechanism and the like by the inexpensive assembly of selected laminated parts.

It is a further object of this invention to provide top caps which may be assembled according to a predetermined plan and which may be held together by a suitable eyelet so as to maintain the predetermined assembly against accidental disarrangement.

It is a further object to provide top caps of the above described type which are so constructed as to be foolproof in their assembly; that is to say, so that the operator assembling the valve is forced to apply the cap in the proper manner on the valve body.

By means of this invention a plurality of valve operations may be provided which will be apparent to those skilled in this art from the following detailed description of various illustrative embodiments thereof, but by way of example it may be mentioned that the valve caps of this invention may be provided with stops at both extreme positions in the angular travel of the valve shaft either with or without initially locking the shaft in off position. Furthermore, the top caps of this invention may be so assembled as to provide stops at both ends of the travel of the shaft as well as intermediate stops, which intermediate stops may be overcome by the inward axial movement of the shaft so as to free the same for a further movement. Furthermore, the invention may include, in combination with any of the above named provisions, a clicking means to serve as an indicator determining the various positions of the valve, all as will be readily understood from the following description.

It is another object of this invention to provide for the degree of flexibility in the assembly of the valve caps through the fact that the various laminated plates may be reversed either end to end or top to bottom in their positions, so as to produce any desired combination of stops that may be desired in any particular case. It is apparent that by turning the laminated plates end to end the same operative conditions may be produced in a left-hand turning valve that would otherwise prevail in a right-hand turning valve. Also, the operation is reversed as to top and bottom by reversing the plates accordingly.

Referring now to the drawing—

Figure 1 is a side elevational view of the valve constructed in accordance with this invention;

Figure 2 is a cross sectional view of the valve shown in Figure 1;

Figure 3 is a cross sectional view taken on the line 3—3 of Figure 2 and looking in the direction of the arrows;

Figure 4 is a plan view of one of the plates constituting the laminated valve cap;

Figure 5 is the exterior locking plate constituting the laminated valve cap;

Figure 6 is an elevational view, in cross section, of a modified form of this invention including a clicking indicating means;

Figure 7 is a plan view of a laminated plate employed in the construction shown in Figure 6;

Figure 8 is a detail of the holding plate and the associated plate which rotates with the shaft in the construction shown in Figure 6;

Figure 9 is an elevational view, in cross section, of a still further modified form of this invention, in which intermediate stops may be provided; and Figure 10 is a perspective view of an assembly of laminated plates constituting the top cap of the valve shown in Figure 9.

By referring to the drawing it will be noted that this invention is illustrated as embodied in a valve comprising a body 20 having a gas inlet 21 and a gas outlet 22. In this form of the invention the inside of the valve body is provided with an internal tapered bore 23 terminating at its inner end with a shoulder 24 and an outlet opening 25, which may be suitably threaded as at 26 for attachment to a gas feeding means. Mounted within the bore of the valve is a valve plug 26, which has a gas passage 27 running thereacross and an axial gas passage 28 communicating with the first named passage. The outer end of the valve plug is recessed as at 29 to receive the end of the valve stem 30. The valve stem 30 is suitably recessed as at 31 and receives a coiled compression spring 32, which spring seats against the bottom of the recess 29 in the end of the valve plug. In addition, the valve stem is slotted so as to accommodate the locking and stop plate 33, which is preferably formed in the manner shown in Figure 2, and is keyed to the shaft by means of a pin 34.

The cap of the valve is composed of a plurality of laminated plates 35 and an outside plate 36. The plates 35 are preferably constructed in the manner shown in Figure 4, with internal stop lugs 37 projecting into the central openings provided therein. Each plate also is provided with a hole 38 at one side and a larger hole 39 at its opposite side. The outside plate 36 is preferably formed as shown in Figure 5, with locking recesses 40 extending from the central shaft opening. This plate also has openings 38 and a larger opening 39 at its ends.

In the form of the invention illustrated in Figure 2 the three plates 35 are preferably of the type shown in Figure 4 and the outside plate 36 is of the type shown in Figure 5. These plates are assembled as a unit prior to the application of the cap to the valve body by means of an eyelet 42. This eyelet is provided with a central opening through which the screw 43 may extend for screw-threaded engagement with the recess 44 provided in the outer face of the valve body. On the opposite side a similar holding screw 43 is provided for engagement in a similar opening 44 in the face of the valve body, so that the valve cap may be held on both sides.

In the face of the valve body at the location of the opening 44 associated with the eyelet 42 there is a recess 45 provided in the face of the valve body for receiving and accommodating the projecting end 46 of the eyelet. This projection is on the inner face of the cap and prevents the improper application of the valve cap to the valve body, as it makes it necessary that the eyelet 42 be placed on the proper side of the valve stem.

The holding and locking plate 33 is provided with shoulders 48 on each side of the stem, which are adapted to fit in the recesses 40 in the outer plate 36. Outward movement of the stem into locking position is caused by the spring 32, which outward movement is limited by the shoulders 49 on the stopping and locking plate. Shoulders 49 come into engagement with the inside surfaces of the outer plate 36. The stopping and locking plate is further provided with the extended end portions 50, which project into the recesses provided by the central opening in the plates 35 between the stop lugs 37. In this illustration the opening occupied by the ends 50 of the stop plate is slightly greater than 90 degrees, so that with allowance for the width of the plate itself and necessary clearance, the stem may be rotated through a 90 degree angle.

It will, of course, be understood that the stem 30 of the shaft has a non-round or similar connection with the valve plug, whereby the stem imparts a turning movement to the valve plug in both directions of rotation, but is at the same time free to have axial movement inwardly and outwardly relative thereto.

In this form of the invention it will be noted that in operation the valve may be maintained in off position and locked therein by the shoulders 48 engaging in the recesses 40 in the outer plate 36. When it is desired to rotate the valve it is merely necessary to give it an inward axial movement to an extent sufficient to free the shoulders 48 from the recesses 40, after which the valve may be freely turned. Thereupon the valve may be turned to on position or any intermediate position within the movement permitted by the construction of the plates 35, in this case through 90 degrees of movement.

In the construction here shown the valve is completely moved from off position to on position when the stem and plug are turned through 90 degrees of movement.

In the form of the invention shown in Figure 6, the cap is composed of a plurality of laminated plates 55 and an outside plate 56. The plates 55 may be constructed as shown in Figure 8, which plates, it will be noted, are provided with a stop lug 57. The outside plate 56 is preferably constructed as shown in Figure 7, it having the usual attaching holes and also angularly disposed clicking lugs 60. These lugs may be formed by pressing a small portion of metal inwardly, which can be accomplished by a stamping operation at the same time that the plate is formed. Instead of a locking plate, this form of the invention employs a stop plate 61 having a non-round opening 62 therein adapted to fit on and turn with the shaft 63. This plate is provided with openings 64 disposed at the same angular relationship as are the lugs 60 on the plate 57. This plate 61 is adapted to have axial movement on the shaft and is maintained in its maximum outward position by means of a coil spring 65, so that the plate is always urged toward the inner face of the plate 56. In this form it will be noted that the positions of the valve will be indicated by a clicking noise, which results from the openings 64 in the plate 61 snapping into and out of registration with the lugs 60 on the outer plate 56. This construction embodies the advantages set forth in the co-pending application of this inventor and George F. Turner, Serial No. 119,982, filed January 11, 1937, except that the laminated cap provides a new, convenient and inexpensive means of embodying this structural feature in the valve construction.

In the form of this invention shown in Figure 9 the construction is quite similar to that shown in Figure 2, with the exception, however, that a different set of laminated plates is employed for the cap member. The plates here employed are illustrated in Figure 10, and they are so designed as to provide an intermediate stop in the rotation of the valve stem. In this form the cap is composed of a plate 70, two additional plates 71, and an outside plate 72. The stem 73, though fixed to rotate the valve plug 74 in both directions, is nevertheless capable of axial movement with respect thereto, which movement is resisted by the coil spring 75 in substantially the manner described in connection with the form of the invention shown in Figure 2.

Instead of a locking plate, however, the stem in this form is provided with a pin 76, which extends outwardly and passes through a slot 77 in the outwardly extending sleeve of the valve plug 74. The end of this pin 76 is adapted to move in the recesses 80 and 81 provided between the lugs which extend into the central opening of the laminated plates.

Upon inspection of Figure 10 it will be observed that the end of the pin is free to rotate in the space between the lugs of the two inner plates 71, 71, and that after traveling a certain distance therein further rotation will be stopped by the contact of the pin with the lug, but upon reaching this point, which is intermediate the maximum turning angle of the valve, the shaft may be thrust inwardly against the resistance of the spring 75 so as to cause the pin to move to a position opposite the inner plate 70. At this point the pin passes into the recess 89 of the plate 70 and is free to move further for a new valve position.

This form of the invention is, of course, adapted to be used in conjunction with valves having multiple outlet openings whereby a selection of valve positions is possible. It will be seen that the valve when in off position may be first moved to an intermediate position to effect one desired communication through the valve, and upon reaching this position it comes to rest, and that thereafter it may be thrust inwardly whereby it is free to undergo a further movement to effect a new and different communication through the valve.

It will be apparent that any combination of plates may be employed to effect any type of valve operation that may be desired in any particular installation.

It will further be apparent that the valve cap is of extremely simple and inexpensive construction and that any combination of plates may be made up either with or without the clicking means illustrated in Figure 6 and with or without the locking plate illustrated in Figure 2. This invention contemplates all possible combinations, and the applicant does not wish to be limited by the disclosure of the illustrative examples here given other than is required by the prior art and as set forth in the appended claim.

I claim:

A valve of the character described, comprising a valve body having an opening therein and inlet and outlet openings communicating with said first-named opening, said valve body further having a face on the end thereof surrounding said first opening and provided with fastener holes for attaching a cap thereon, a movable valve member disposed in said first opening for establishing communication through said inlet and outlet openings, said valve member having a sleeve projecting therefrom provided with a longitudinal slot extending to the outer edge of said sleeve, a valve stem disposed in said sleeve and having an opening therethrough, a member disposed in said opening and having an end projecting through the slot in said sleeve and therebeyond, said valve stem being mounted for limited axial movement with respect to said movable valve member, and a spring disposed between said stem and movable valve member for resisting said axial movement, a combined valve cap and control member comprising a preformed assembly of a plurality of selected laminated plates, at least certain of which have stop lugs thereon disposed in predetermined angular positions around said valve stem and collectively providing a predetermined path of movement for the end of said projecting member, said projecting member further being adapted to contact said stop lugs for limiting the movement of said stem and to be freed from at least one of said stops by axial movement of said stem, said cap having means for securing said plates together and having holes therethrough in alignment with said holes in the face of said valve body, fasteners in said holes for attaching said cap on the face of said valve body, and cooperating means on said cap and valve body for preventing said cap being mounted in more than one position thereon.

PHILIP S. HARPER.